(12) United States Patent
Ellerhorst

(10) Patent No.: US 11,840,404 B2
(45) Date of Patent: Dec. 12, 2023

(54) ROLLER PLATE ASSEMBLY

(71) Applicant: Crown Plastics Co., Harrison, OH (US)

(72) Inventor: Peter Ellerhorst, Harrison, OH (US)

(73) Assignee: Crown Plastics Co., Harrison, OH (US)

( * ) Notice: Subject to any disclaimer, the term of this patent is extended or adjusted under 35 U.S.C. 154(b) by 43 days.

(21) Appl. No.: 17/520,847

(22) Filed: Nov. 8, 2021

(65) Prior Publication Data

US 2022/0153529 A1     May 19, 2022

Related U.S. Application Data

(60) Provisional application No. 63/113,353, filed on Nov. 13, 2020.

(51) Int. Cl.
*B65G 39/12*     (2006.01)
*B65G 39/02*     (2006.01)
*B65G 13/11*     (2006.01)

(52) U.S. Cl.
CPC .............. *B65G 39/12* (2013.01); *B65G 13/11* (2013.01); *B65G 39/02* (2013.01); *B65G 2201/0235* (2013.01)

(58) Field of Classification Search
None
See application file for complete search history.

(56) References Cited

U.S. PATENT DOCUMENTS

| 7,882,945 B2 * | 2/2011 | Willi | B65G 13/073 198/791 |
| 10,407,259 B2 * | 9/2019 | Choung | B65G 37/005 |
| 2018/0237160 A1 * | 8/2018 | Rodenkirch | B64F 1/322 |

* cited by examiner

*Primary Examiner* — Kavel Singh
(74) *Attorney, Agent, or Firm* — Wood Herron & Evans LLP

(57) ABSTRACT

A roller plate assembly includes a base plate having a plurality of openings distributed along a length and a width of the base plate. The roller plate assembly includes at least two cross supports coupled to the base plate. The roller plate assembly also includes a roller shaft extending at least partially through the at least two cross supports and a plurality of rollers rotatably mounted to the roller shaft. Each roller is disposed within a corresponding one of the plurality of openings and configured to project at least partly over the upper surface of the base plate. The plurality of rollers are configured to allow a package to move across the plurality of rollers from a first edge of the roller plate assembly to a second edge of the roller plate assembly in the length direction of the base plate.

18 Claims, 5 Drawing Sheets

ROLLER PLATE ASSEMBLY

CROSS-REFERENCE TO RELATED APPLICATION

This application claims the benefit of priority to U.S. Provisional Patent Application Ser. No. 63/113,353 filed Nov. 13, 2020 (pending), the disclosure of which is incorporated by reference herein in its entirety.

TECHNICAL FIELD

The invention relates generally to material handling systems and, more particularly, to roller plate assemblies for material handling systems.

BACKGROUND

Material handling systems, such as those used for moving boxes or packages, often have a first conveyor system at one level and a second conveyor system at a second, lower level. Roller mat assemblies may be used to allow the boxes or packages to move between the first (higher) conveyor and the second (lower) conveyor. In some respects, the roller mat assembly serves as a transition between the first conveyor and the second conveyor.

Typically, a roller mat assembly is static and does not have a moveable conveyor belt. Instead, the roller mat assembly may have an injection molded plastic base plate and a series of rollers affixed to the base plate. As a box or package leaves the end of the first (upper) conveyor system, it contacts the rollers and moves down the roller mat assembly largely contacting the tops of the rollers until the box or package reaches the end of and is transported away by the second (lower) conveyor system.

A roller mat assembly is generally angled at least 8 degrees from the horizontal so that a box or package may move over the rollers unassisted, except for gravity. Larger angles may be used when the height difference between the first conveyor system and second conveyor system is greater and/or the spacing between the end of the first conveyor system and the end of the second conveyor system is shorter. When the angle is higher and heavy boxes or packages fall off the end of the first conveyor system, the heavy boxes or packages may apply a significant force on the roller mat assembly and especially the injection molded plastic base plate. Over time, the injection molded plastic base plate may fracture/break, develop cracks/holes, and disable the rollers in the base plate. When a sufficient number of rollers become damaged or disabled (i.e., non-functioning), the boxes or packages may stop on the roller mat assembly and create a jam as additional boxes or packages are discharged from the first conveyor system onto the roller mat assembly. Such a jam often requires that the first conveyor system be shut down and the jam manually cleared. Once the base plate starts to become damaged and rollers become damaged or disabled, jams of boxes or packages may become more and more frequent as the condition of the damaged section(s) worsens. Eventually the roller mat assembly becomes so damaged that jams become too frequent and the roller mat assembly must be replaced. Replacing the roller mat assembly requires that the first and second conveyor systems be shut down, which causes a great disruption to the material handling capacity of the facility.

What is needed, therefore, is a roller mat assembly that will not be so easily damaged by heavy boxes or packages.

SUMMARY OF THE INVENTION

To these and other ends, a roller plate assembly includes a base plate with a plurality of openings distributed along a length and a width of the base plate. The base plate has an upper surface and a lower surface. The roller plate assembly includes at least two cross supports coupled to the lower surface of the base plate and at least two roller shafts spaced apart and extending at least partially through the at least two cross supports and extending in the width direction of the base plate. The roller plate assembly further includes a plurality of rollers rotatably mounted to the at least two roller shafts, each roller disposed within a corresponding one of the plurality of openings and configured to project at least partly over the upper surface of the base plate. The plurality of rollers are configured to allow a package to move across the plurality of rollers from a first edge of the roller plate assembly to a second edge of the roller plate assembly in the length direction of the base plate.

In an embodiment, the plurality of openings in the base plate may include a first group of openings where each opening thereof is configured to accommodate a single roller and a second group of openings where each opening thereof is configured to accommodate at least two rollers. Further, the first group of openings and second group of openings may form an array of openings in the base plate extending in the length direction and width direction of the base plate. In one aspect, the array of openings may be configured such that the first group of openings are interposed between the second group of openings in the length direction. In another aspect, the array of openings may be configured such that the first group of openings are interposed between the second group of openings in the width direction. In yet another aspect, the array of openings may be configured such that the first group of openings are interposed between the second group of openings in both the length direction and the width direction.

In an embodiment, the base plate may be made of aluminum and the plurality of rollers may be made of polyoxymethylene.

In an embodiment, the roller plate assembly further includes an additional or second roller plate assembly like the first roller plate assembly. Each base plate of each roller plate assembly includes opposing side flanges extending along the width of each base plate. The side flange of one of the base plates of one roller plate assembly is configured to be connected to a corresponding side flange of the base plate of the other one of the roller plate assemblies.

In an embodiment, the at least two cross supports are disposed at opposing ends of the base plate and the roller plate assembly further includes at least an additional cross support disposed between the at least two cross supports and coupled to the lower surface of the base plate. The at least two roller shafts extend through the additional cross support and only partially through the at least two cross supports.

In an embodiment, the plurality of rollers are free of bushings or bearings.

The invention also contemplates a material handling system that includes a first conveyor system having a discharge end, a second conveyor system spaced downstream from the first conveyor system, the second conveyor system having a receiving end. The material handling system also includes at least one roller plate assembly disposed between the discharge end of the first conveyor system and the receiving end of the second conveyor system. The roller plate assembly includes a base plate with a plurality of openings distributed along a length and a width of the base plate. The base plate has an upper surface and a lower surface. The roller plate assembly includes at least two cross supports coupled to the lower surface of the base plate and at least two roller shafts spaced apart and extending at least partially through the at least two cross supports and extending in the width direction of the base plate. The roller plate assembly further includes a plurality of rollers rotatably mounted to the at least two roller shafts, each roller disposed within a corresponding one of the plurality of openings and configured to project at least partially over the upper surface of the base plate. The plurality of rollers are configured to allow a package to move across the plurality of rollers from a first edge of the roller plate assembly to a second edge of the roller plate assembly in the length direction of the base plate.

The roller plate assembly of the material handling system may include all the features in the various embodiments described herein.

In an embodiment, the material handling system may further include an additional or second roller plate assembly like the first roller plate assembly. Each base plate of each roller plate assembly includes opposing side flanges extending along the width of each base plate. The side flange of one of the base plates of one roller plate assembly is configured to be connected to a corresponding side flange of the base plate of the other one of the roller plate assemblies.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION OF THE INVENTION

Figure 1:
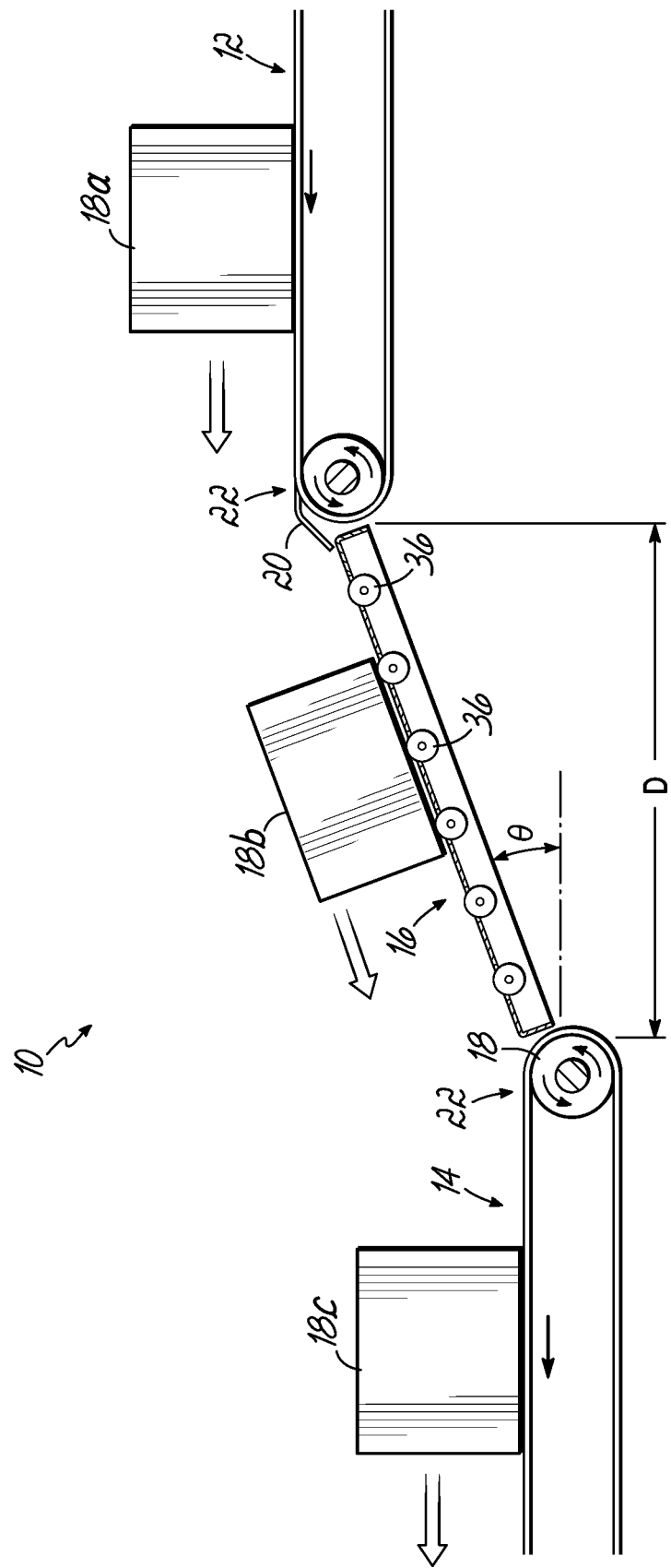
FIG. 1 is a schematic representation of a material handling system with a roller plate assembly.

A material handling system 10 is schematically illustrated in FIG. 1. The material handling system 10 includes a first (upper) conveyor system 12, a second (lower) conveyor system 14, and a roller plate assembly 16 according to one embodiment of the invention positioned between the first and second conveyor systems 12, 14. In FIG. 1, boxes or packages 18a, 18b, 18c are illustrated moving along the first conveyor system 12, down the roller plate assembly 16, and along the second conveyor system 14. To assist the box or package 18a move off a discharge end 22 of the first conveyor system 12 and onto the roller plate assembly 16, a transition member 20 may extend from the end of the first conveyor system 12 to bridge a gap between the discharge end 22 of the first conveyor system 12 and the roller plate assembly 16. When the box or package 18b leaves the roller plate assembly 16, it enters onto a receiving end 24 of the second conveyor system 14.

To accommodate the height difference between the first conveyor system 12 and the second conveyor system 14, the roller plate assembly 16 is positioned at an angle 8 relative to the horizontal. Generally, the angle 8 should be at least 6 degrees, and preferably at least 8 degrees or greater.

FIG. 1 illustrates the discharge end 22 of the first conveyor system being a distance D from the receiving end 24 of the second conveyor system. In an embodiment, only one roller plate assembly 16 extends that distance D between the discharge end 22 of the first conveyor system 12 and the receiving end 24 of the second conveyor system 14. Additional roller plate assemblies 16 may be connected along their long edges to accommodate a wider distance D between the discharge end 22 of the first conveyor system 12 and the receiving end 24 of the second conveyor system. Any number of roller plate assemblies 16 may be connected to span that distance D, such as more than 2 roller plate assemblies 16, more than 10 roller plate assemblies 16, or more than 20 roller plate assemblies depending upon the distance D between the discharge end 22 of the first conveyor system and the receiving end 24 of the second conveyor system 14.

Figure 2:
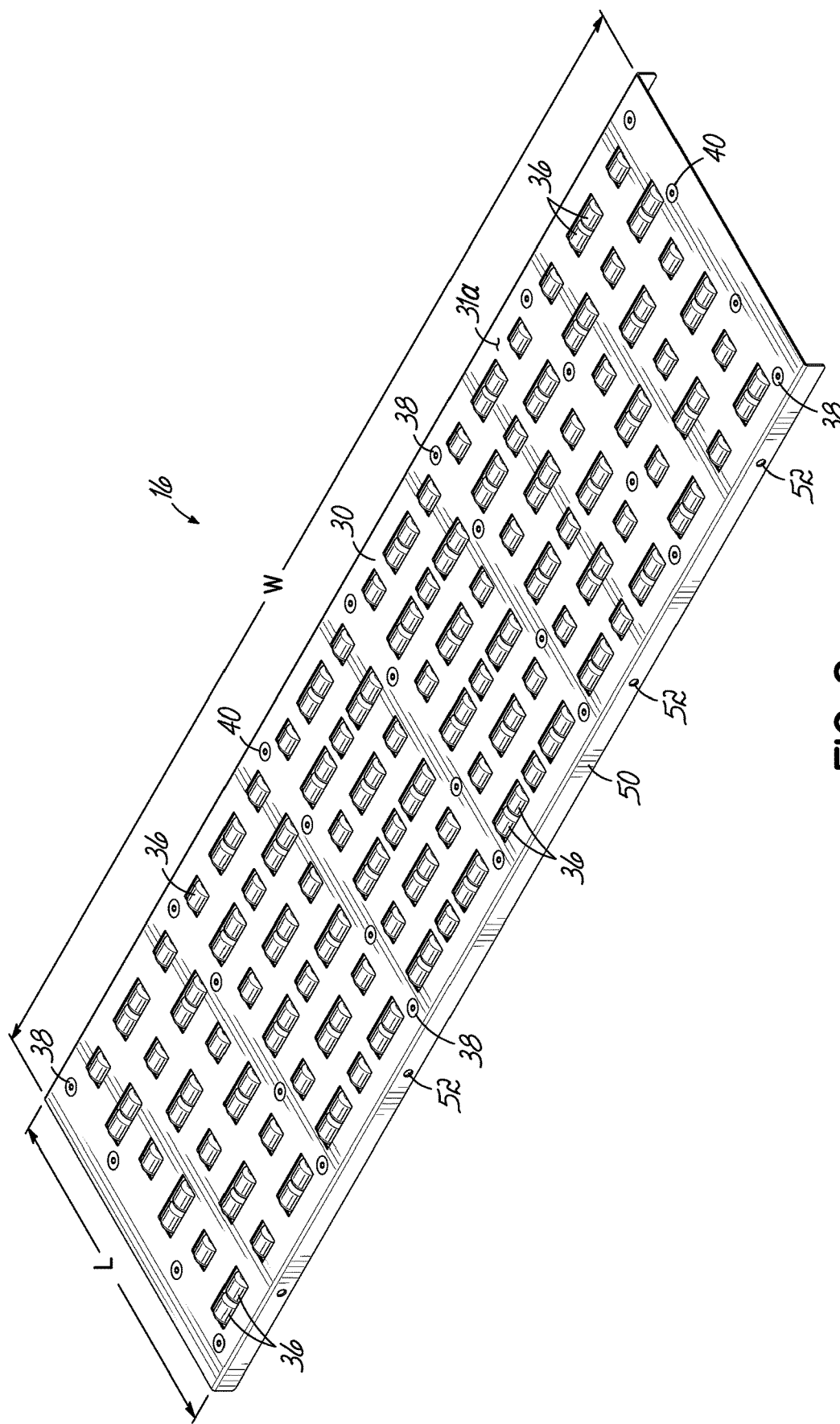
FIG. 2 is perspective view of a roller plate assembly according to an embodiment of the invention.

One embodiment of the roller plate assembly 16 is shown in FIGS. 2-5. The roller plate assembly 16 includes a base plate 30 with upper and lower surfaces 31a, 31b, cross supports 32, roller shafts 34, and rollers 36. The base plate has a length L and a width W, as depicted in FIG. 2. Fasteners, such as screws 38, may be used to secure the cross supports 32 to the lower surface 31b of the base plate 30. The screws 38 pass through holes 40 in the base plate and engage threaded holes in the top of the cross supports 32. In an embodiment, the screws 38 may be socket flat heads screws with ¼-20 threads and may be zinc plated. The roller shafts 34 pass through passages 42 in each of the five "inside" cross supports 32. The ends of each roller shaft 34 terminate in the cross supports 32a, 32b, which are disposed at opposing ends of base plate, in passages 42a, 42b (FIGS. 3 and 5) that do not pass all the way through the cross supports 32a, 32b. Each roller shaft 34 is a continuous piece extending from one end of the roller plate assembly 16 to the other.

In one embodiment, the passages 42a, 42b may go all the way through the cross supports 32a, 32b and the roller shafts 34 go through and extend out of the passages 42a, 42b. The roller shafts 34 may be held in place and prevented from moving relative to the cross supports 32 by split rings (not shown) which are inserted into holes at either end of the roller shaft 34.

Each roller 36 has a center hole 44 sized to allow the roller shaft 34 to be inserted therethrough and to allow the roller 36 to freely rotate about roller shaft 34. The roller 36 may be made of any suitable material. In one embodiment, the roller 36 may be made from ultra-high-molecular-weight (UHMW) polyethylene or polyoxymethylene (also known as acetal, polyacetal, polyformaldehyde, and paraformaldehyde) (sometimes sold under the tradename Delrin™), for example. The roller 36 does not have a bearing or bushing in the center hole 44. Instead, the roller 36 directly contacts the exterior surface of the roller shaft 34. Because there is no bearing or bushing, there is no bearing or busing to wear out over time, keeping maintenance costs down as there are no worn bearings or bushings to replace. Moreover, the roller 36 made of UHMW or Delrin™ will run more quietly on the roller shaft 34 compared a roller with a bearing or bushing. Over time a roller with a bearing or bushing will become louder as the bearing or bushing wears, accumulates dirt, and starts to deteriorate. That increased noise may be problematic in a warehouse setting where there are many roller plate assemblies operating thereby subjecting workers to ever increasing and perhaps unsafe noise levels.

Figure 3:
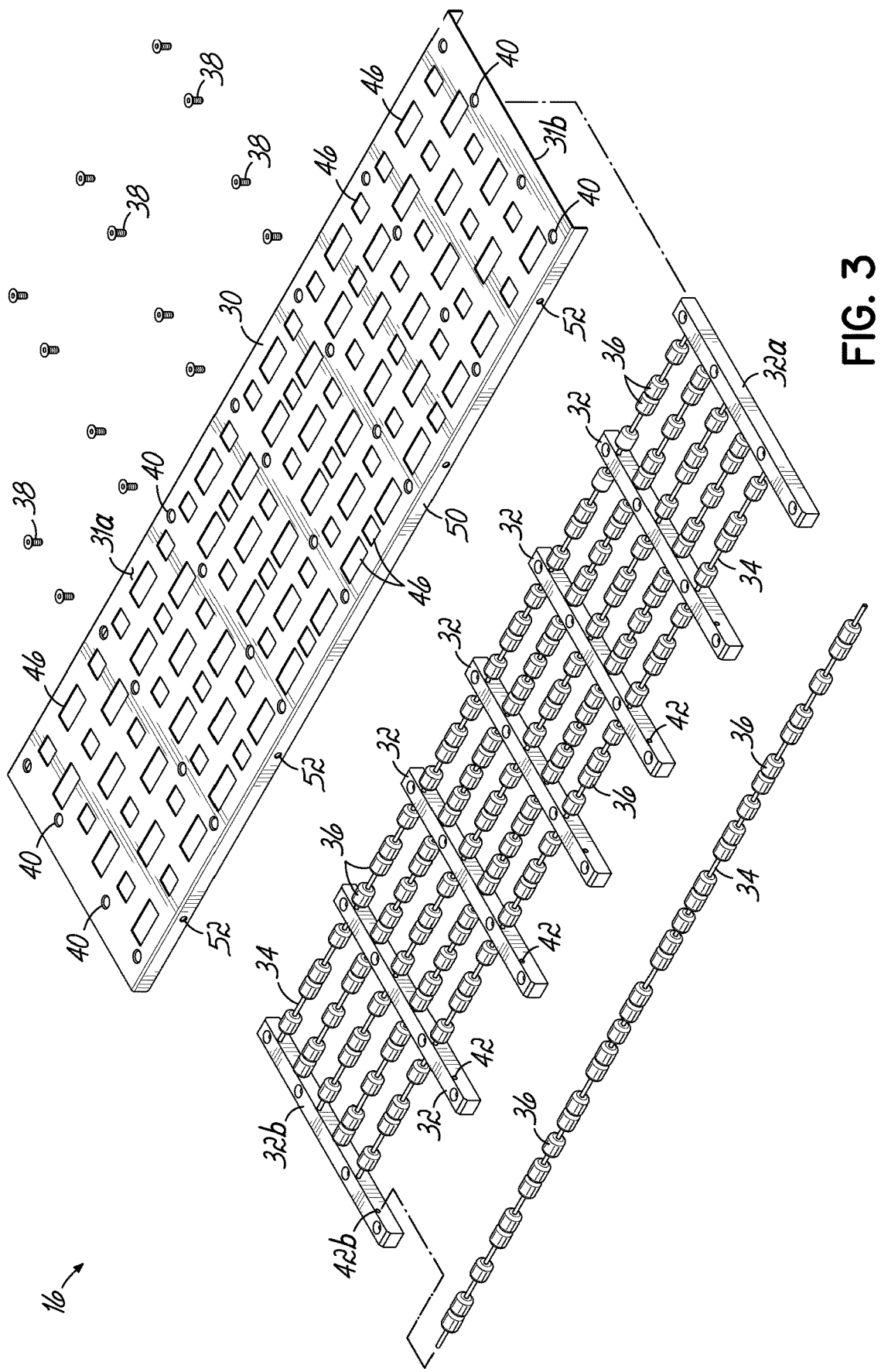
FIG. 3 is a partially disassembled, perspective view of the roller plate assembly of FIG. 2.
Figure 4:
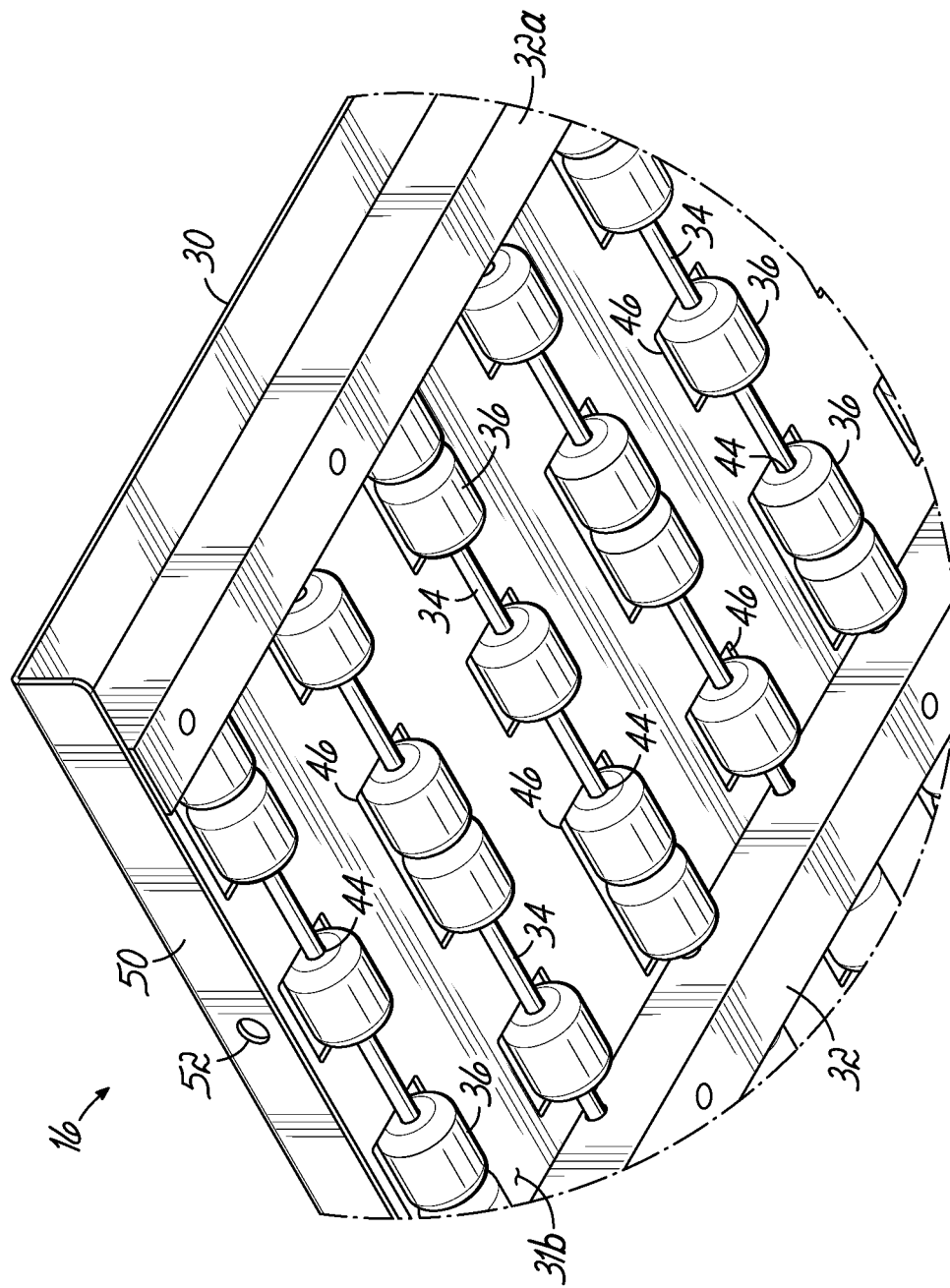
FIG. 4 is partial bottom perspective view of the roller plate assembly of FIG. 2.
Figure 5:
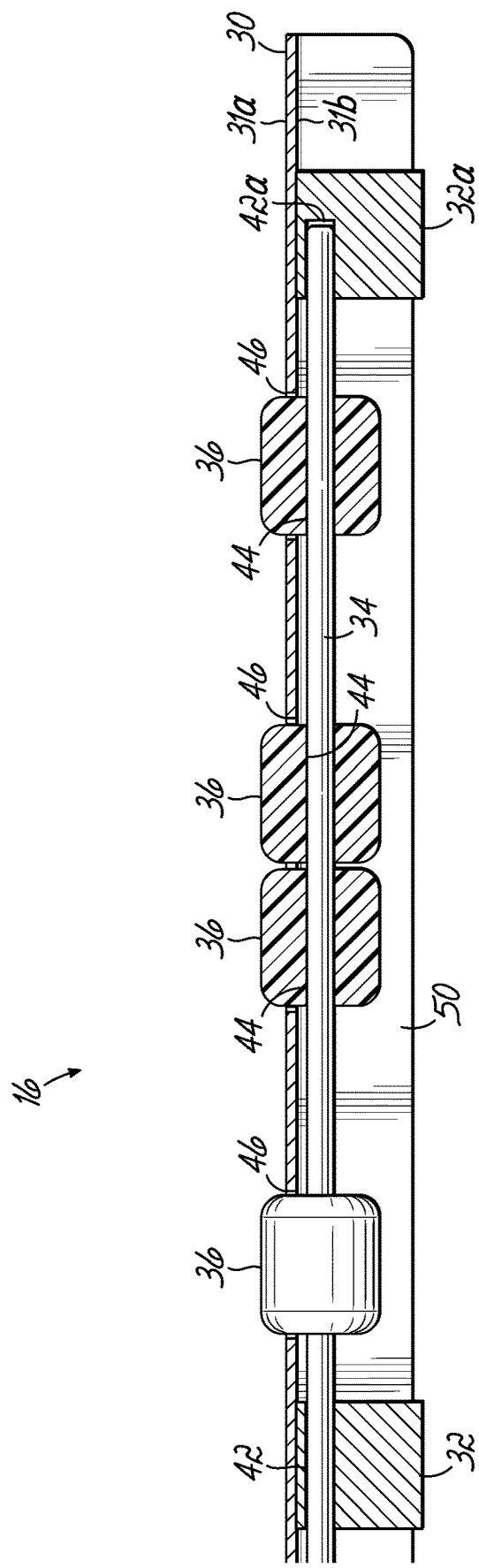
FIG. 5 is a partial, cross-sectional view of the roller plate assembly of FIG. 2.

The base plate 30 includes a plurality of openings 46 (FIG. 3). A first group of openings 46 may be configured or sized to accommodate a single roller 36 therein and project at least partly over the upper surface 31a of the base plate 30. A second group of openings 46 may be configured or sized to accommodate at least two rollers 36 therein and project at least partially over the upper surface 31a of the base plate 30. The first group of openings 46 and second group of openings 46 may form an array of openings 46 in the base plate 30 extending in the length direction and width direction of the base plate. In the embodiment illustrated in the figures, the array of different sized openings 46 are alternatingly positioned along the width of the base plate 30 so that in a section of the base plate 30 between the adjacent cross supports 32 there is a single roller 36 next to two adjacent rollers 36 on roller shaft 34. The spacing of the different sized openings 46 and thus the rollers 36 associated with adjacent roller shafts 34 also alternate in the length of the base plate 30. This alternating pattern of the different sized openings 46 is apparent in the base plate 30 shown in FIGS. 2 and 3. It will be appreciated that other spacings may be used for the openings 46 to create different alternating patterns both along the roller shafts 34 and between adjacent roller shafts 34. In addition, the openings 46 may be the same size or may be larger to accommodate three or more rollers 36 therein.

The base plate 30 includes side flanges 50 which includes holes 52. As discussed above, if two or more roller plate assemblies 16 are needed to span the distance D between the discharge end 22 of the first conveyor system 12 and receiving end 24 of the second conveyor system 14, the roller plate assemblies 16 may be connected to each other by fasteners (e.g., nut and bolt) positioned in the holes 52 in the side flanges 50 of abutting roller plate assemblies 16.

In one embodiment, the base plate 30 may be about 42 inches long and about 12 inches wide. It will be appreciated that the base plate 30 may have other lengths and widths depending upon the dimensions of the material handling system 10 and the gap and height difference between the first conveyor system 12 and the second conveyor system 14. The thickness of the base plate 30 (including the side flange 50) may be about % of an inch, although other thicknesses may also be used. In one embodiment, the base plate 30 may be made from either aluminum or stainless steel, although other gauges and materials may be used.

In one embodiment, the roller 36 may have an overall length in the range of 0.5-1.0 inches and preferably 0.817 inches and a diameter in the range of 0.5-0.9 inches and preferably 0.7 inches. The center hole 44 of the roller 36 may have a diameter in the range of 0.15 to 0.20 inches and preferably 0.168 inches.

In one embodiment, the roller shaft 34 may be made of alloy steel, although the roller shaft 34 may be made of any suitable material. The roller shaft 34 may have a diameter in the range of 0.10 to 0.19 inches and preferably 0.156 inches.

In one embodiment, the cross support 32 may be made from aluminum and preferably 6061 aluminum, although the cross support 32 may be made from any suitable material. The cross support 32 may have a square cross-section with each side being in the range of 0.5 to 1.0 inches and preferably 0.75 inches.

All dimensions stated herein are exemplary and not limiting. The components of the roller plate assembly 16 may be sized to accommodate a particular material handling system 10 and/or the size and weight of the boxes/packages 18a, 18b, 18c.

While the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A roller plate assembly comprising:
   a base plate having a plurality of openings distributed along a length and a width of the base plate, the base plate having an upper surface and a lower surface;
   at least two cross supports coupled to the lower surface of the base plate;
   at least two roller shafts spaced apart and extending at least partially through the at least two cross supports and extending in the width direction of the base plate; and
   a plurality of rollers rotatably mounted to the at least two roller shafts, each roller disposed within a corresponding one of the plurality of openings and configured to project at least partly over the upper surface of the base plate,
   wherein the plurality of rollers are configured to allow a package to move across the plurality of rollers from a first edge of the roller plate assembly to a second edge of the roller plate assembly in the length direction of the base plate, and
   wherein the plurality of openings in the base plate includes a first group of openings where a single roller is disposed in each opening thereof and a second group of openings where at least two rollers are disposed in each opening thereof and wherein each single roller and each of the at least two rollers are mounted about the at least two roller shafts and aligned with a longitudinal axis of the at least two roller shafts.

2. The roller plate assembly of claim 1, wherein the first group of openings and the second group of openings form an array of openings in the base plate extending in the length direction and width direction of the base plate.

3. The roller plate assembly of claim 2, wherein the array of openings is configured such that the first group of openings are interposed between the second group of openings in the length direction.

4. The roller plate assembly of claim 2, wherein the array of openings is configured such that the first group of openings are interposed between the second group of openings in the width direction.

5. The roller plate assembly of claim 2, wherein the array of openings is configured such that the first group of openings are interposed between the second group of openings in the length direction and the width direction.

6. The roller plate assembly of claim 1, wherein the base plate is made of aluminum and the plurality of rollers is made of polyoxymethylene.

7. The roller plate assembly of claim 1, further comprising an additional roller plate assembly accordingly to claim 1, wherein each base plate of each roller plate assembly includes opposing side flanges extending along the width of each base plate, the side flange of one of the base plates of one roller plate assembly being configured to be connected to a corresponding side flange of the base plate of the other one of the roller plate assemblies.

8. The roller plate assembly of claim 1, wherein the at least two cross supports are disposed at opposing ends of the base plate, the roller plate assembly further comprising at least an additional cross support disposed between the at least two cross supports and coupled to the lower surface of the base plate, the at least two roller shafts extending through the additional cross support and only partially through the at least two cross supports.

9. The roller plate assembly of claim 1, where the plurality of rollers are free of bushings or bearings.

10. A materials handling system comprising:
   a first conveyor system having a discharge end;
   a second conveyor system spaced downstream from the first conveyor system, the second conveyor system having a receiving end;
   at least one roller assembly disposed between the discharge end of the first conveyor system and the receiving end of the second conveyor system, the roller assembly including:
      a base plate having a plurality of openings distributed along a length and a width of the base plate, the base plate having an upper surface and a lower surface;
      at least two cross supports coupled to the lower surface of the base plate;
      at least two roller shafts spaced apart and extending at least partially through the at least two cross supports and extending in the width direction of the base plate; and
      a plurality of rollers rotatably mounted to the at least two roller shafts, each roller disposed within a corresponding one of the plurality of openings and configured to project at least partly over the upper surface of the base plate,
   wherein the plurality of rollers are configured to allow a package to move across the plurality of rollers from a first edge of the roller plate assembly to a second edge of the roller plate assembly in the length direction of the base plate, and
   wherein the plurality of openings in the base plate includes a first group of openings where a single roller is disposed in each opening thereof and a second group of openings where at least two rollers are disposed in each opening thereof and wherein each single roller and each of the at least two rollers are mounted about the at least two roller shafts and aligned with a longitudinal axis of the at least two roller shafts.

11. The materials handling system of claim 10, wherein the first group of openings and the second group of openings form an array of openings in the base plate extending in the length direction and width direction of the base plate.

12. The materials handling system of claim 11, wherein the array of openings is configured such that the first group of openings are interposed between the second group of openings in the length direction.

13. The materials handling system of claim 11, wherein the array of openings is configured such that the first group of openings are interposed between the second group of openings in the width direction.

14. The materials handling system of claim 11, wherein the array of openings is configured such that the first group of openings are interposed between the second group of openings in the length direction and the width direction.

15. The materials handling system of claim 10, wherein the base plate is made of aluminum and the plurality of rollers is made of polyoxymethylene.

16. The materials handling system of claim 10, further comprising an additional roller plate assembly, wherein each base plate of each roller plate assembly includes opposing side flanges extending along the width of each base plate, the side flange of one of the base plates of one roller plate assembly being configured to be connected to a corresponding side flange of the base plate of the other one of the roller plate assemblies.

17. The materials handling system of claim 10, wherein the at least two cross supports are disposed at opposing ends of the base plate, the roller plate assembly further comprising at least an additional cross support disposed between the at least two cross supports and coupled to the lower surface of the base plate, the roller shaft extending through the additional cross support and only partially through the at least two cross supports.

18. The materials handling system of claim 10, wherein the plurality of rollers are free of bushings or bearings.

* * * * *